(12) United States Patent
Smithson

(10) Patent No.: US 9,964,232 B2
(45) Date of Patent: May 8, 2018

(54) CRYOGENIC VACUUM VALVE

(71) Applicant: Robert Lee Smithson, Cocoa, FL (US)

(72) Inventor: Robert Lee Smithson, Cocoa, FL (US)

( * ) Notice: Subject to any disclaimer, the term of this patent is extended or adjusted under 35 U.S.C. 154(b) by 351 days.

(21) Appl. No.: 14/856,937

(22) Filed: Sep. 17, 2015

(65) Prior Publication Data

US 2017/0082216 A1    Mar. 23, 2017

(51) Int. Cl.
*F16K 51/02* (2006.01)
*F16K 17/168* (2006.01)
*F16K 17/04* (2006.01)

(52) U.S. Cl.
CPC ............. *F16K 51/02* (2013.01); *F16K 17/04* (2013.01); *F16K 17/168* (2013.01)

(58) Field of Classification Search
USPC .......... 137/625.48, 516.25, 516.27; 251/309, 251/310, 311
See application file for complete search history.

(56) References Cited

U.S. PATENT DOCUMENTS

| | | | | |
|---|---|---|---|---|
| 2,631,002 A | * | 3/1953 | Mueller | F16K 5/0414 251/310 |
| 2,634,748 A | * | 4/1953 | Morrison | F16K 1/00 137/523 |
| 3,166,097 A | * | 1/1965 | Hinderer | F16K 5/0414 137/625.17 |
| 3,283,778 A | * | 11/1966 | Linna | F16K 1/303 137/512.3 |
| 3,802,457 A | * | 4/1974 | Wurzburger | F16K 5/0407 137/327 |
| 3,815,871 A | * | 6/1974 | Carlson | F16K 5/0414 251/310 |
| 3,874,637 A | * | 4/1975 | Jones | F16K 3/26 251/339 |
| 5,215,117 A | * | 6/1993 | Petersen | F16K 1/303 137/512.3 |
| 5,372,158 A | * | 12/1994 | Berfield | E03C 1/104 137/217 |
| 5,662,139 A | * | 9/1997 | Lish | A62C 37/50 137/523 |

* cited by examiner

*Primary Examiner* — Jessica Cahill
*Assistant Examiner* — Daphne M Barry
(74) *Attorney, Agent, or Firm* — Dunlap Bennett & Ludwig PLLC

(57) ABSTRACT

A multifunction cryogenic vacuum valve adapted to evacuate, seal off, and monitor vacuum levels and relieve cryogenic vacuum insulated systems is provided, wherein no thread sealant is necessary for the thermocouple threads.

6 Claims, 6 Drawing Sheets

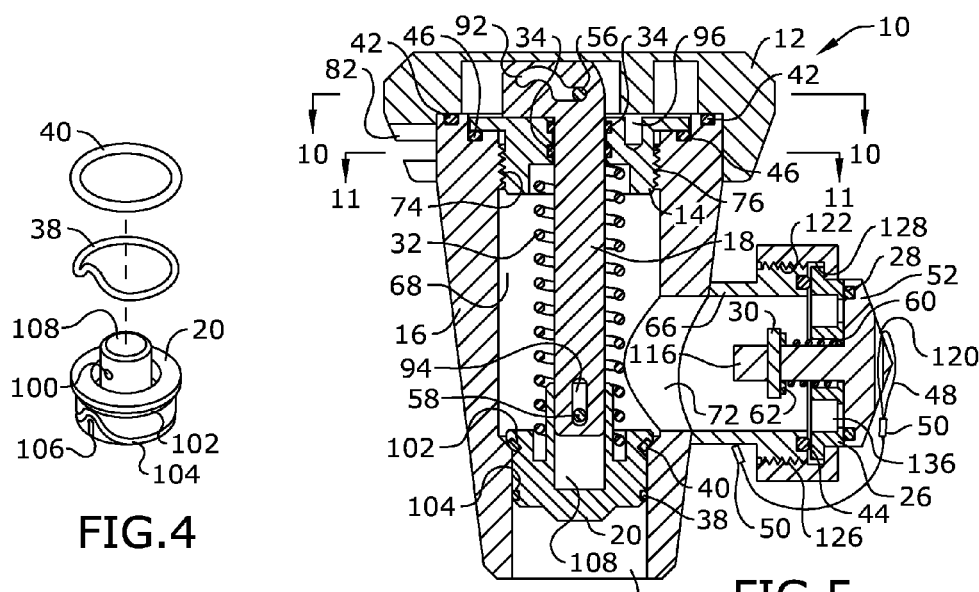
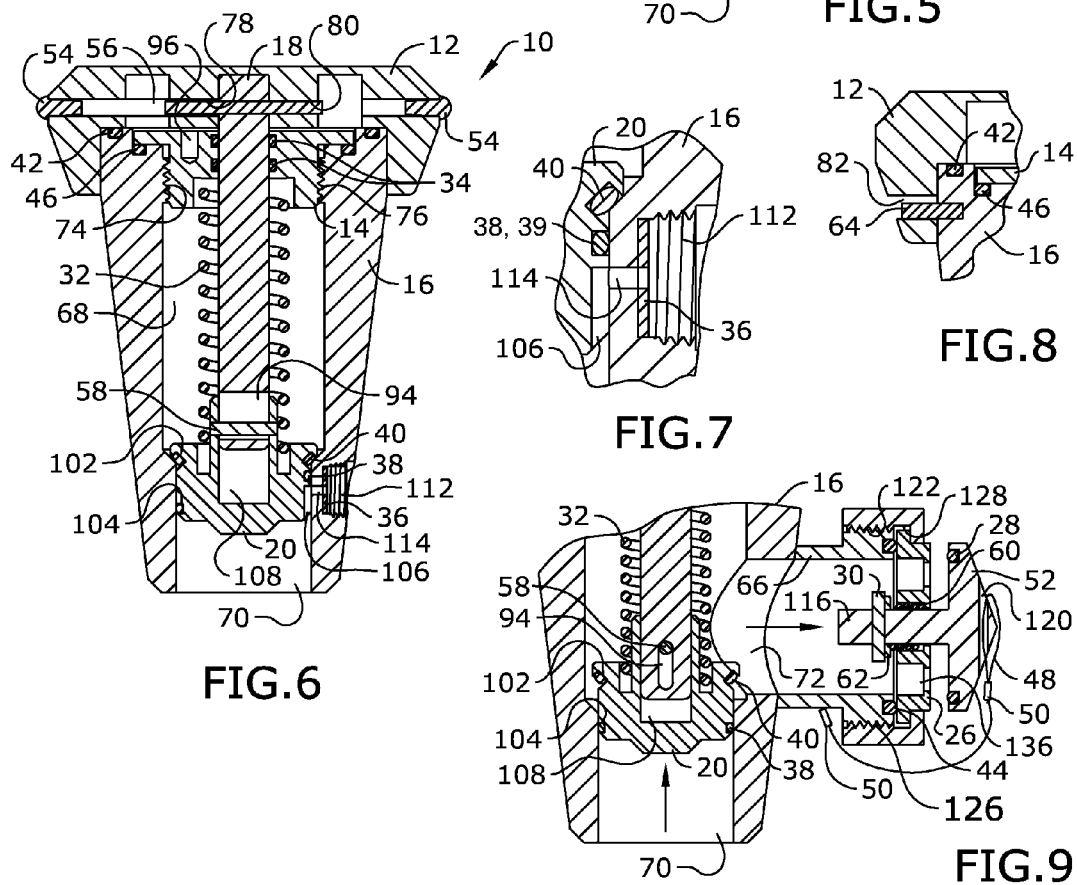

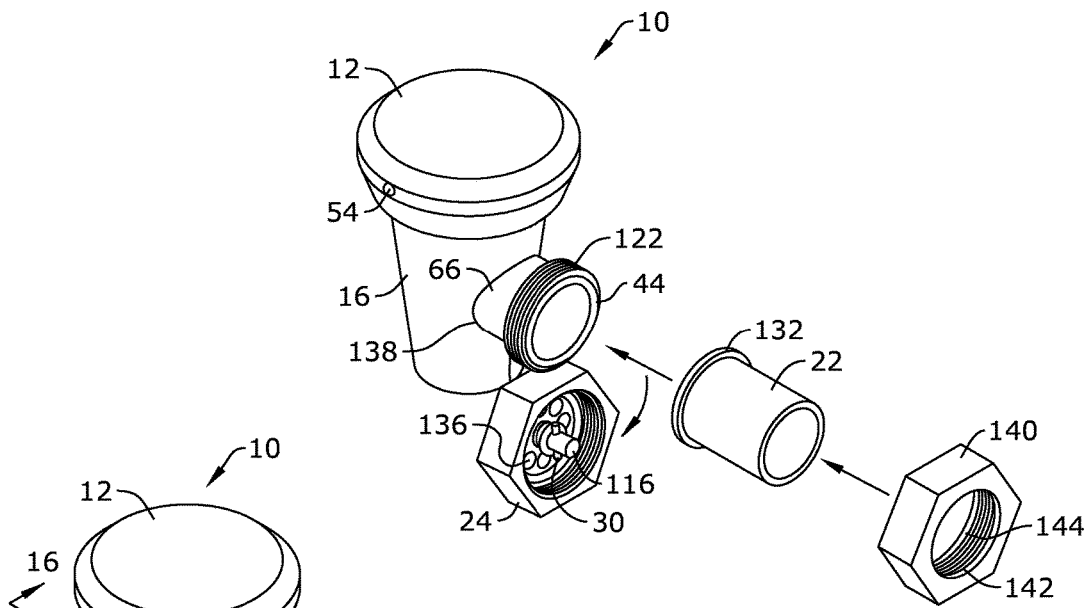
FIG.14
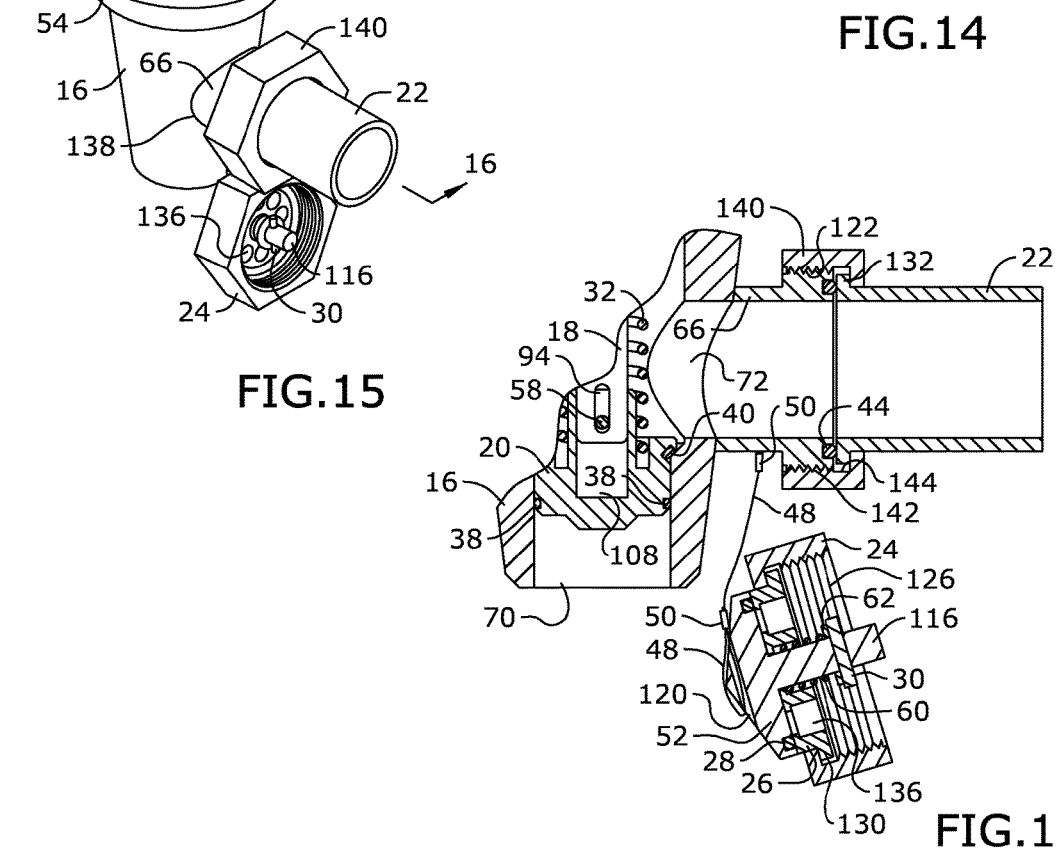
FIG.15
FIG.16

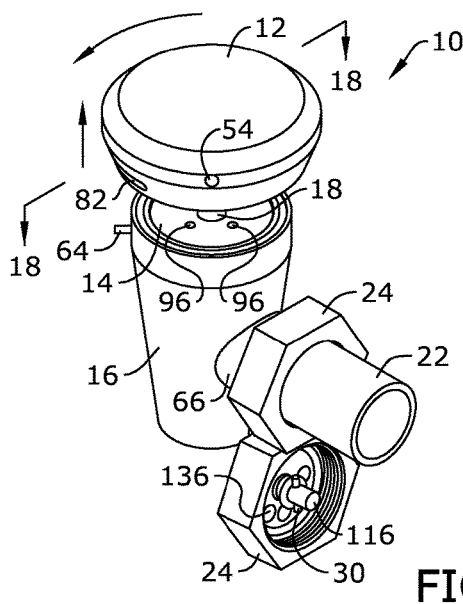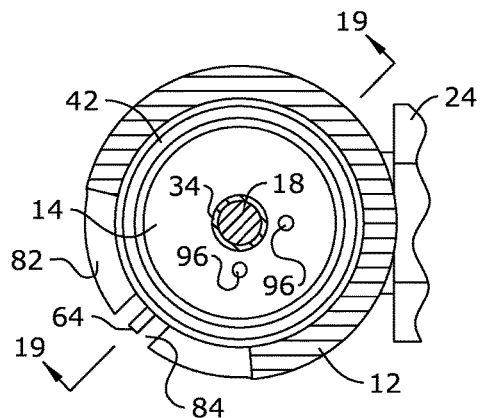
FIG. 17
FIG. 18
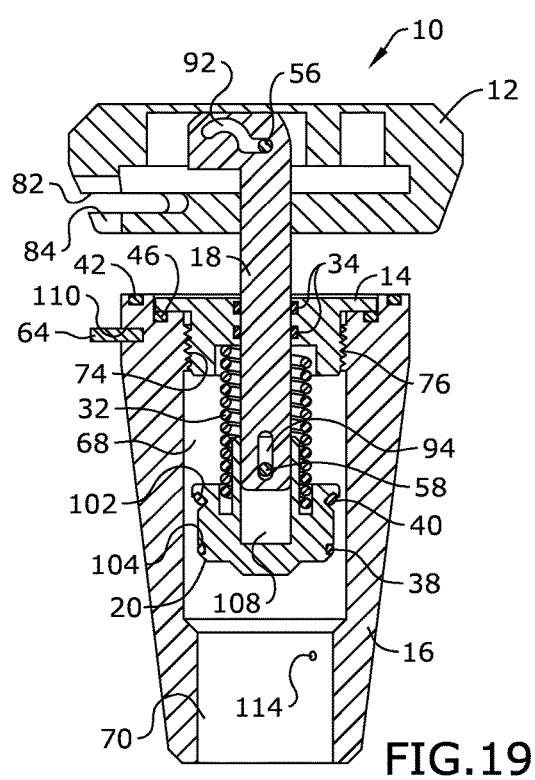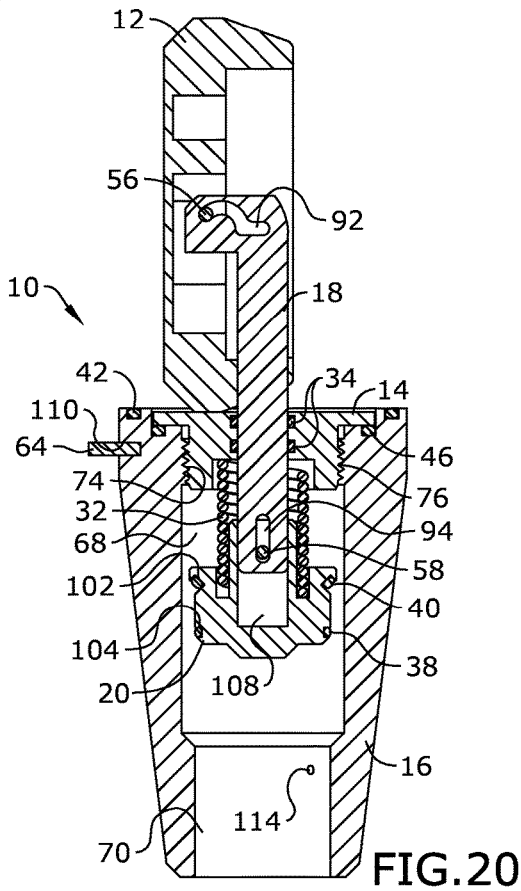
FIG. 19
FIG. 20

CRYOGENIC VACUUM VALVE

BACKGROUND OF THE INVENTION

The present invention relates to cryogenic systems and, more particularly, to a multifunction cryogenic valve adapted to evacuate, seal off, and monitor vacuum levels and relieve over-pressure for cryogenic vacuum insulated systems.

Current evacuation valves for cryogenic vacuum insulated systems require additional components to make their valves function. The added components require additional space and clearance to operate; require more maintenance, spare parts, cleaning; and pose additional potential leak points and risk of breakage. The added components are needed to provide vacuum pump down, and monitoring of the vacuum, as well as an external operator and thermocouple isolation valve to evacuate and monitor the customers systems. Moreover, isolation valves require thread sealant on the thermocouple to keep the threads from leaking. Thread sealant is a concern in liquid oxygen systems because of the potential for ignition and fire. Thread sealant deteriorates after a period of time and requires replacement which makes it a maintenance requirement.

As can be seen, there is a need for a multifunction valve adapted to evacuate, seal off, monitor vacuum levels and relieve over-pressure for cryogenic vacuum insulated systems, wherein no thread sealant is necessary.

SUMMARY OF THE INVENTION

In one aspect of the present invention, a cryogenic vacuum valve includes a valve body forming a wide body cavity fluidly communicating with a narrower narrow body cavity; a valve plug defined by a circumferential surface dimensioned and adapted to snugly fit within the narrow body cavity; a top plug o-ring groove formed along an upper portion of the circumferential surface; a bottom plug o-ring groove formed along an lower portion of the circumferential surface so as to be spaced apart from the top plug o-ring groove, wherein the bottom plug o-ring groove is omega shape, and wherein the omega shape has a upper apex and a remaining portion; a thermocouple exposure slot formed along the circumferential surface so as to be disposed downward of the upper apex; and a thermocouple vacuum exposure hole formed through the valve body to fluidly communicate with the narrow body cavity, wherein the valve plug is movable from a go position to a stop position communicating the thermocouple vacuum exposure hole with the thermocouple exposure slot.

In another aspect of the present invention, a cryogenic multi-function vacuum valve includes a valve body forming a wide body cavity fluidly communicating with a narrower narrow body cavity; a valve plug defined by a circumferential surface dimensioned and adapted to snugly fit within the narrow body cavity; a top plug o-ring groove formed along an upper portion of the circumferential surface; a bottom plug o-ring groove formed along an lower portion of the circumferential surface so as to be spaced apart from the top plug o-ring groove, wherein the bottom plug o-ring groove is omega shape, and wherein the omega shape has a upper apex and a remaining portion; a thermocouple exposure slot formed along the circumferential surface so as to be disposed downward of the upper apex; a thermocouple vacuum exposure hole formed through the valve body to fluidly communicate with the narrow body cavity; a cap rotatably mounted to an upper portion of the valve body, wherein the cap forms a central projection forming a cavity through which is secured a cap roll pin; and a valve shaft interconnecting the cap and the valve plug, wherein the valve shaft has an upper end operatively engaging the central projection, wherein the upper end forms a shaft cap pin slot adapted to operative engage the cap roll so that rotating the cap moves the valve plug between the go position and the stop position communicating the thermocouple vacuum exposure hole with the thermocouple exposure slot, wherein the go position comprises the thermocouple vacuum exposure hole being disposed downward of the remaining portion of the bottom plug o-ring groove, and wherein the go position comprises the thermocouple vacuum exposure hole being disposed downward of the remaining portion of the bottom plug o-ring groove.

These and other features, aspects and advantages of the present invention will become better understood with reference to the following drawings, description and claims.

BRIEF DESCRIPTION OF THE DRAWINGS

FIG. 4 is a detailed reverse exploded view of an exemplary embodiment of the present invention;

FIG. 5 is a section view of an exemplary embodiment of the present invention;

FIG. 6 is a section view of an exemplary embodiment of the present invention;

FIG. 7 is a detailed section view of an exemplary embodiment of the present invention;

FIG. 8 is a detailed section view of an exemplary embodiment of the present invention;

FIG. 9 is a detailed section view of an exemplary embodiment of the present invention;

FIG. 14 is a perspective view of an exemplary embodiment of the present invention;

FIG. 15 is a perspective view of an exemplary embodiment of the present invention;

FIG. 16 is a section view of an exemplary embodiment of the present invention;

FIG. 17 is a perspective view of an exemplary embodiment of the present invention, illustrating turning an exemplary embodiment of a valve cap 45 degrees and lifting the connected assembly upward;

FIG. 18 is a section view of an exemplary embodiment of the present invention;

FIG. 19 is a section view of an exemplary embodiment of the present invention; and FIG. 20 is a section view of an exemplary embodiment of the present invention.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Broadly, an embodiment of the present invention provides a multifunction cryogenic valve adapted to evacuate, seal off, monitor vacuum levels and relieve over-pressure in cryogenic vacuum insulated systems.

Figure 1:
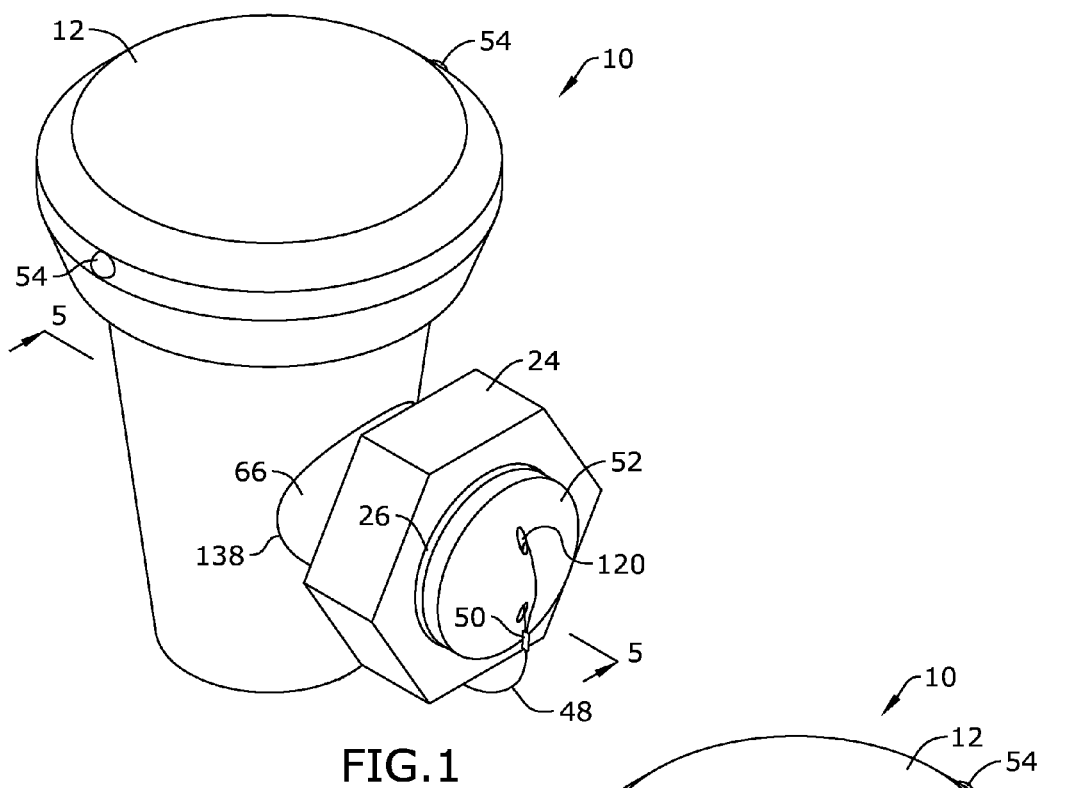
FIG. 1 is a front perspective view of an exemplary embodiment of the present invention.
Figure 2:
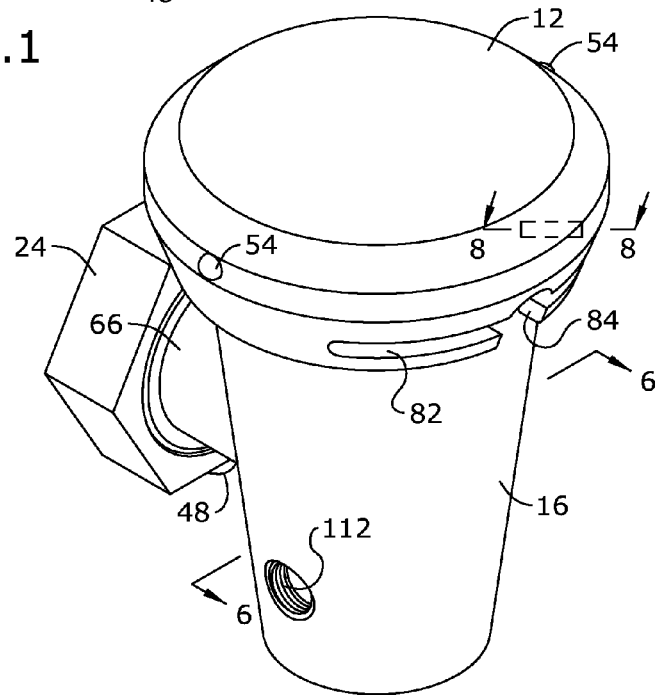
FIG. 2 is a rear perspective view of an exemplary embodiment of the present invention.
Figure 3:
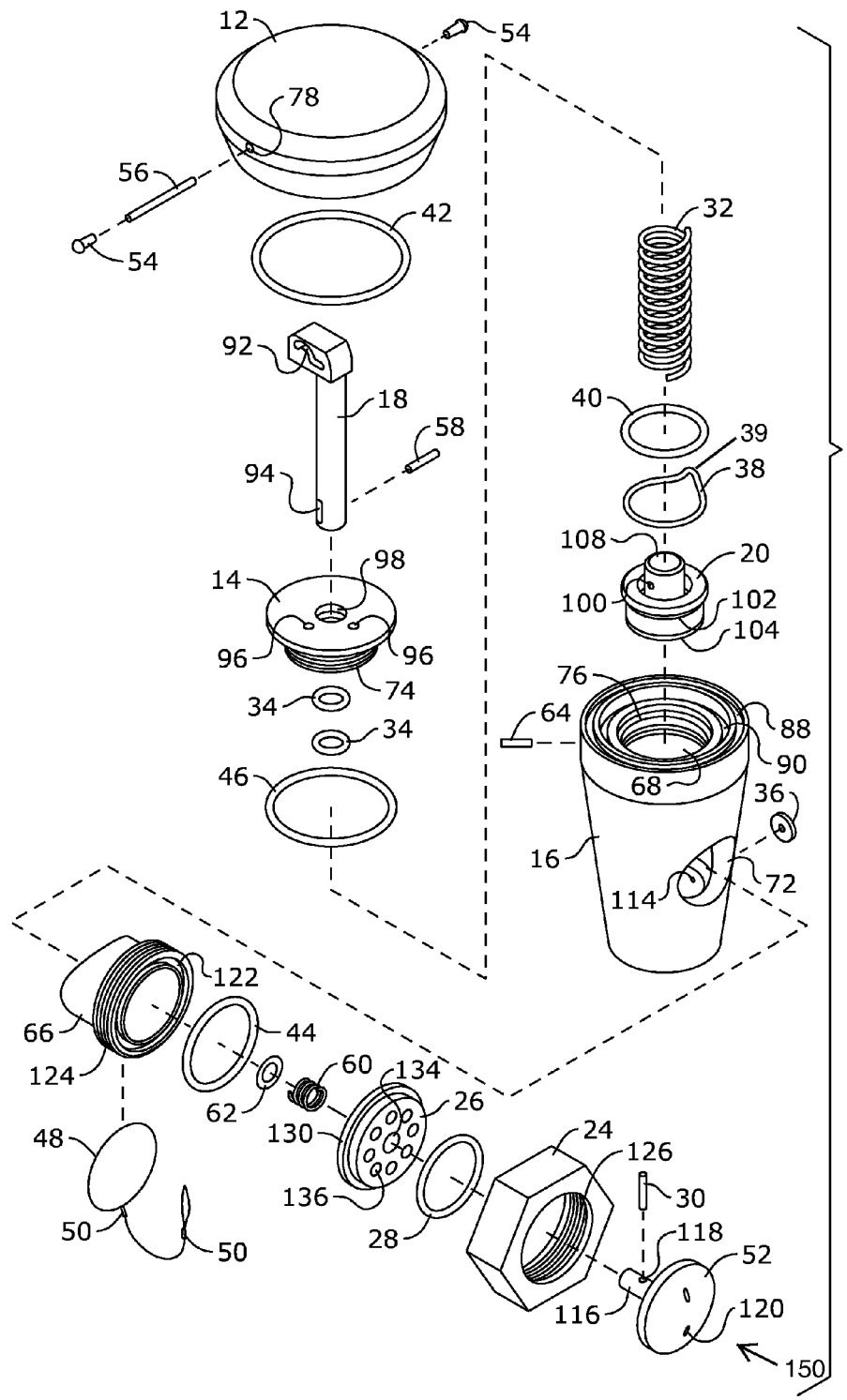
FIG. 3 is an exploded view of an exemplary embodiment of the present invention.

Referring to FIGS. 1 through 20, the present invention may include a multifunction cryogenic valve 10 adapted to evacuate, seal off, monitor and relieve cryogenic vacuum insulated systems. The multifunction cryogenic valve 10 may include a valve body 16 forming a tubular wide body cavity 68 fluidly communicating to a narrower narrow body cavity 70 via a conical transition as illustrated in FIGS. 19 and 20. The wide body cavity 68 may extend from the conical transition to a top portion, wherein the top portion forms a top opening. The top portion may form a body o-ring groove 88 near an outer periphery thereof and a sunken top recess inward from the outer periphery. The body o-ring groove 88 may be dimensioned to snugly receive a body o-ring 42; and the sunken top recess may form a top o-ring groove 90 for snugly receiving a top o-ring 46, as illustrated in FIG. 3.

It should be understood, that the valve body 16 forms the body cavities 68, 70 along a shared longitudinal axis, wherein each cavity 68, 70 is concentric about, though consecutively along. As a result, terminology such as "upward", "downward", "upper", "lower", "top", "bottom" is reference relative to positioning about the longitudinal axis, and not necessarily as relative to the force of gravity.

Figure 13:
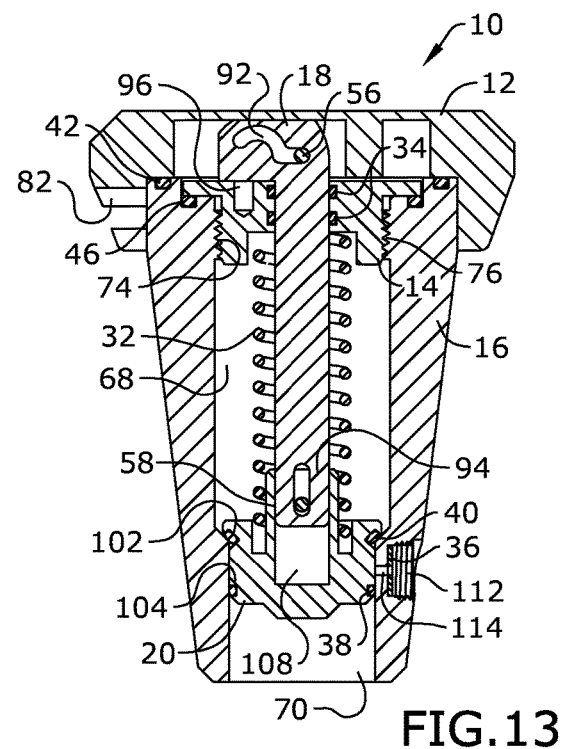
FIG. 13 is a section view of an exemplary embodiment of the present invention.

The multifunction cryogenic valve 10 may also provide a valve top 14 dimensioned and adapted to be snugly received within the top opening so that a top flange portion may be supported by the sunken top recess, as illustrated in FIG. 13. The top flange portion may form at least one wrench hole 96 for installation purposes. The valve top 14 may have a tubular projection adapted and dimensioned to extend from the top flange portion into the wide body cavity 68. Said tubular projection may form peripheral threading 74 to securely engage operating body cavity threading 76. Said tubular projection forms a top shaft hole 98, wherein at least one peripheral shaft ring groove is formed along its circumference, each dimensioned to snugly receive a shaft o-ring 34.

The multifunction cryogenic vacuum valve 10 may also provide a valve plug 20 adapted and dimensioned to frictionally engage the narrow body cavity 70. A centrally disposed plug shaft hole 108 may be formed in a plug shaft that extends upwardly from the center of a body of the valve plug 20 so as to project toward the wide body cavity 68. The plug shaft hole 108 may form a plug pin hole 100. The body of the valve plug 20 may form spaced-apart top and bottom plug o-ring grooves 102, 104, each dimensioned to snugly receive top and bottom plug o-rings 40, 38, respectively. The bottom plug o-ring 104 and thus the snugly-fitting bottom plug o-ring 38 may be omega-shaped, as illustrated in FIG. 3. The omega shape may include an upward projecting segment 39, whose upper apex is elevated above a majority of the remaining portion of the bottom plug o-ring 38. The body of the valve plug 20 may form a thermocouple exposure slot 106 along a circumferential surface thereof, as illustrated in FIG. 4. The thermocouple exposure slot 106 is disposed to align with the upward projecting segment 39.

The multifunction cryogenic vacuum valve 10 may also provide a valve shaft 18 extending from an upper end to a lower end, wherein the lower end is dimensioned and adapted to be snugly received through the top shaft hole 98, through a lumen of a body spring 32, extending into the wide body cavity 68 so as to be at least partially received within the plug shaft hole 108. Thereby, forming an annular space between the valve shaft 18 and the circumference of the body cavity 68. The valve shaft 18 may be periscope shaped, wherein the upper end may form a generally rectangular shape, as illustrated in FIG. 13. The lower end may form an elongated shaft plug pin slot 94 dimensioned to slidably receive a plug roll pin 58 to ride therein, as illustrated in the Figures. The upper end may form a step-shaped shaft cap pin slot 92.

Figure 10:
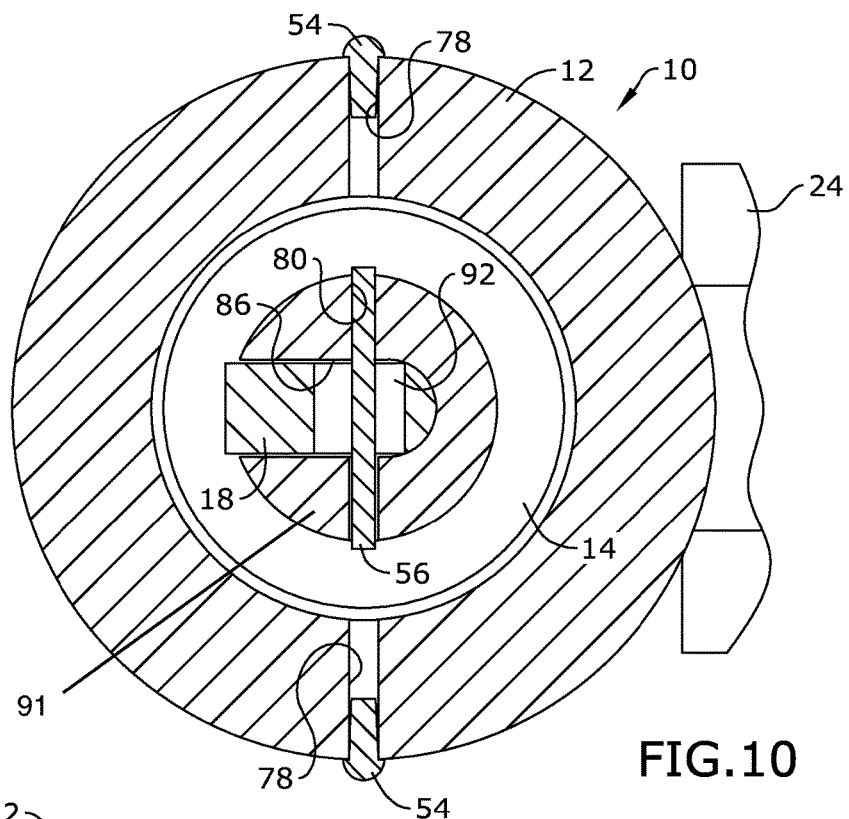
FIG. 10 is a section view of an exemplary embodiment of the present invention.
Figure 11:
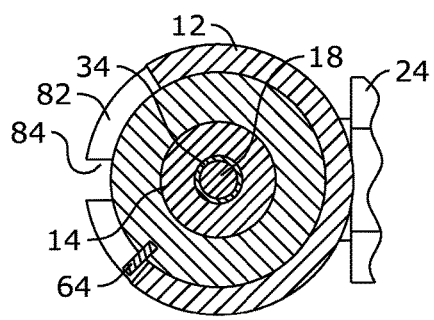
FIG. 11 is a section view of an exemplary embodiment of the present invention.

The multifunction cryogenic vacuum valve 10 may also provide a cap 12 having a body portion and, extending from the body portion, an annular ring dimensioned and adapted to snugly receive a portion of the top portion, as illustrated in FIGS. 5 and 13. The body portion may form a central projection 91, wherein the central projection 91 and the annular ring are separated by a space, as illustrated in FIG. 6. The central projection 91 may form a cap shaft slot 86 dimensioned to receive the upper end of the valve shaft 18. A narrow cap pin hole 80 may be formed in the central projection 91 so as to generally align with the shaft cap pin slot 92, wherein a cap roll pin 56 is dimensioned to slidably be received through both, as illustrated in FIG. 10.

Figure 12:
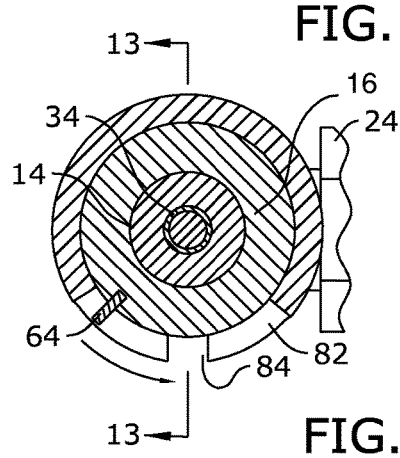
FIG. 12 is a section view of an exemplary embodiment of the present invention.

The annular ring may form diametrically opposing wide cap pin holes 78 that generally align with the narrow cap pin hole 80, wherein a pair of cap hole pins 54 are dimensioned to slidably and securely be received into the wide cap pin holes 78. The annular ring may form a cap outer slot 82 extending along a periphery thereof, wherein a wider cap outer slot opening 84 may be disposed generally midpoint along the cap outer slot 82, as illustrated in FIGS. 2 and 12. A body pin 64 may be disposed along a periphery of the valve body 16, for example, protruding from a formed body pin hole 110, wherein the body pin 64 is adapted and dimensioned to ride along the cap outer slot 82 when the cap 12 rotates about the portion of the top portion, as illustrated in FIG. 12.

A lower portion of the valve body 16 may form a thermocouple threaded hole 112 fluidly communicating to the narrow body cavity 70 via a thermocouple. A thermocouple seal 36 may be disposed in the thermocouple threaded hole 112 so as to operatively engage the thermocouple vacuum exposure hole 114. The thermocouple vacuum exposure hole 114 may be disposed along the lower portion of the valve body 16 so as to sufficiently align with the thermocouple exposure slot 106.

A side body opening 72 may be formed into the valve body 16. A tubular valve flange 66 may be provided so as to be operatively welded by a fillet weld 138, such as a TIG weld, along a periphery of side body opening 72. The valve flange 66 may provide on one end flange threading 124 and a flange o-ring groove 122, the groove 122 being dimensioned to snugly receive a flange o-ring 44.

The present invention may include a relief valve assembly 150. The relief valve assembly 150 may include a relief valve poppet 52 sandwiching a relief valve body 26 against the one end of the valve flange 66, and held in place by a coupling nut 24 providing inner threading 126 and a retainer slot 128. The relief valve body 26 may form a body portion forming a centrally disposed relief valve body center hole 134 surrounded by a plurality of relief valve body exhaust holes 136, wherein a retainer ring 130 may be formed along the periphery of said body portion, wherein the retainer ring 130 operatively engages the retainer slot 128. A body portion of the relief valve poppet 52 may form at least one tether slot 120 and a relief valve o-ring groove, said groove being dimensioned to snugly receive a relief valve o-ring 28. A relief valve poppet shaft 116 may be centrally disposed and extend from the body portion of the relief valve poppet 52. The relief valve poppet shaft 116 may form a relief valve pin hole 118 dimensioned to slidably receive a relief valve roll pin 30. The relief valve poppet shaft 116 may extend through the relief valve body center hole 134, wherein a relief valve spring 60 is disposed, so that the relief valve roll pin 30 is held in place by the relief valve washer 62, as illustrated in FIG. 9.

Evacuation and Seal Off:

To evacuate a system, the relief valve assembly 150 may be removed and allowed to hang from its tether cable 48 operatively engaging the at least one tether slot 120 by means of a tether crimp 50. A user may attach evacuation equipment to the valve flange 66 by way of a coupling tube 22 forming a peripheral retainer ring 132 and a second coupling nut 140 having threading 142 and a second retainer slot 144, as illustrated in FIG. 14, wherein the second retainer slot 144 operatively engages the retainer ring 132, as illustrated in FIG. 16. The user then starts his pump and when the vacuum level is satisfactory, the cap 12 is lifted and shifted to the left and rotated up 90 degrees to the vertical position, whereby the cap roll pin 56 rides along the shaft cap pin slot 92, as illustrated in FIG. 20. This enables the pump to begin pumping on the annular space between the inner vessel and the outer shell. Once a satisfactory vacuum level has been reached the cap 12 is rotated down to the closed position which seals off the systems vacuum annular space.

Vacuum Monitoring:

Vacuum level monitoring can be accomplished any time the present invention is in the closed position, wherein the cap 12 is down. The bottom plug o-rings groove 104 and thus the bottom plug o-ring 38 enable the thermocouple to be exposed when the top of the bottom plug o-ring 38 rises above the thermocouple exposure hole 114, as illustrated in FIGS. 6 and 7. This is accomplished by turning the cap 12 90 degrees to a thermocouple stop position where it is secured with the body pin 64 riding within and along the cap outer slot 82, as illustrated in FIG. 12. When in the thermocouple stop position, the thermocouple hole 114 communicates with the exposure slot 106 as a result of the upward projecting segment 39 of the bottom plug o-ring 38 disposed relative to the thermocouple hole 114, as illustrated in FIG. 7. The multifunction cryogenic vacuum valve 10 can stay in this position for as long as the user requires, since the system is still sealed off with the top plug o-ring 40. If the vacuum level is satisfactory, the cap 12 is turned 90 degrees back the other way—to a thermocouple go position—causing the bottom plug o-ring 38 to transition below the thermocouple hole 114 and providing a two o-ring—top and bottom plug o-rings 40, 38—seal to maintain a more reliable vacuum seal off. This position is the standby or normal position and the cap 12 is secured to the assembly by the body pin 64 riding within the along the cap outer slot 82.

Pressure Relief:

Pressure relief is required if there is a leak in the inner vessel and the cryogen begins to expand in the narrow body cavity 70. The present invention provides for over pressure relief by the incorporation of the relief valve assembly 150 mounted on the flange 66. When there is an increase in the annular pressure within the narrow body cavity 70 above a predetermined threshold the valve plug 20 rises on the valve shaft 18 by way of the plug roll pin 58 riding along the elongated shaft plug pin slot 94, as illustrated in FIG. 9. The predetermined threshold specified by the user through the selection of a predetermined body spring 32 and relief valve spring 60. This allows the relief valve assembly 150 to be exposed to the overpressure and it will push the relief valve poppet shaft 116 of the relief valve assembly 150 open and vent the over pressure to atmosphere. When the pressure is reduced to the design pressure the relief valve assembly 150 will close to maintain system cleanliness and integrity. This relief action will continue for as long as required until the over pressure is corrected.

It should be understood, of course, that the foregoing relates to exemplary embodiments of the invention and that modifications may be made without departing from the spirit and scope of the invention as set forth in the following claims.

What is claimed is:

1. A cryogenic vacuum valve, comprising:
   a valve body forming a wide body cavity fluidly communicating with a narrower narrow body cavity;
   a valve plug with a circumferential surface which abuts against the narrow body cavity;
   a top plug o-ring groove formed along an upper portion of the circumferential surface;
   a bottom plug o-ring groove formed along a lower portion of the circumferential surface so as to be spaced apart from the top plug o-ring groove, wherein the bottom plug o-ring groove is omega shape, and wherein the omega shape has a upper apex and a remaining portion;
   a thermocouple exposure slot formed along the circumferential surface so as to be disposed downward of the upper apex;
   a thermocouple vacuum exposure hole formed through the valve body to fluidly communicate with the narrow body cavity, wherein the valve plug is movable from a go position to a stop position communicating the thermocouple vacuum exposure hole with the thermocouple exposure slot;
   a cap rotatably mounted to an upper portion of the valve body; and
   a valve shaft interconnecting the cap and the valve plug so that rotating the cap moves the valve plug between the go position and the stop position, wherein the cap forms a central projection adapted to operatively engage an upper end of the valve shaft and, wherein the upper end forms a shaft cap pin slot adapted to operatively engage a cap roll pin secured by the central projection.

2. The cryogenic vacuum valve of claim 1, wherein the go position comprises the thermocouple vacuum exposure hole being disposed downward of the remaining portion of the bottom plug o-ring groove.

3. The cryogenic vacuum valve of claim 1, wherein the shaft cap pin slot has a step shape which the cap roll pin rides along when the cap moves between the go and the stop positions.

4. The cryogenic vacuum valve of claim 1, further comprising top and bottom o-rings dimensioned to fit their respective plug o-ring groove and protrude therefrom.

5. A cryogenic vacuum valve, comprising:
   a valve body forming a wide body cavity fluidly communicating with a narrower narrow body cavity;
   a valve plug with a circumferential surface which abuts against the narrow body cavity;
   a top plug o-ring groove formed along an upper portion of the circumferential surface;
   a bottom plug o-ring groove formed along a lower portion of the circumferential surface so as to be spaced apart from the top plug o-ring groove, wherein the bottom plug o-ring groove is omega shape, and wherein the omega shape has a upper apex and a remaining portion;

a thermocouple exposure slot formed along the circumferential surface so as to be disposed downward of the upper apex;

a thermocouple vacuum exposure hole formed through the valve body to fluidly communicate with the narrow body cavity;

a cap rotatably mounted to an upper portion of the valve body, wherein the cap forms a central projection forming a cavity through which is secured a cap roll pin; and a valve shaft interconnecting the cap and the valve plug, wherein the valve shaft has an upper end operatively engaging the central projection, wherein the upper end forms a shaft cap pin slot adapted to operatively engage the cap roll so that rotating the cap moves the valve plug between a go position and a stop position communicating the thermocouple vacuum exposure hole with the thermocouple exposure slot, wherein the go position comprises the thermocouple vacuum exposure hole being disposed downward of the remaining portion of the bottom plug o-ring groove, and wherein the go position comprises the thermocouple vacuum exposure hole being disposed downward of the remaining portion of the bottom plug o-ring groove.

6. The cryogenic vacuum valve of claim 5, further comprising top and bottom o-rings dimensioned to fit their respective plug o-ring groove and protrude therefrom.

* * * * *